US010202508B2

(12) United States Patent
Tong et al.

(10) Patent No.: US 10,202,508 B2
(45) Date of Patent: Feb. 12, 2019

(54) DYE COMPOUNDS

(71) Applicant: MERCK PATENT GMBH, Darmstadt (DE)

(72) Inventors: Qiong Tong, Darmstadt (DE); Peer Kirsch, Seeheim-Jugenheim (DE); Michael Junge, Pfungstadt (DE); Ursula Patwal, Reinheim (DE); Andreas Beyer, Hanau (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/106,631

(22) PCT Filed: Nov. 19, 2014

(86) PCT No.: PCT/EP2014/003087
§ 371 (c)(1),
(2) Date: Jun. 20, 2016

(87) PCT Pub. No.: WO2015/090497
PCT Pub. Date: Jun. 25, 2015

(65) Prior Publication Data
US 2017/0002203 A1 Jan. 5, 2017

(30) Foreign Application Priority Data
Dec. 19, 2013 (EP) ..................... 13005918

(51) Int. Cl.
C09B 57/00 (2006.01)
C09K 19/60 (2006.01)
G02F 1/1337 (2006.01)
(52) U.S. Cl.
CPC ............ C09B 57/004 (2013.01); C09K 19/60 (2013.01); G02F 1/1337 (2013.01)
(58) Field of Classification Search
CPC .................................................. C09B 57/004
See application file for complete search history.

(56) References Cited

U.S. PATENT DOCUMENTS

| 4,308,162 | A | 12/1981 | Cole et al. | |
|---|---|---|---|---|
| 5,969,154 | A * | 10/1999 | Hao ................... | C09K 19/3483 252/299.61 |
| 7,501,076 | B2 | 3/2009 | Yamamoto et al. | |
| 7,906,039 | B2 | 3/2011 | Yamamoto et al. | |
| 7,948,583 | B2 | 5/2011 | Minato et al. | |
| 7,965,353 | B2 | 6/2011 | Akao et al. | |
| 8,081,276 | B2 | 12/2011 | Minato et al. | |
| 8,927,856 | B2 | 1/2015 | Debije et al. | |
| 8,999,195 | B2 | 4/2015 | Chu et al. | |
| 9,164,314 | B2 | 10/2015 | Van Oosten | |
| 9,249,356 | B2 | 2/2016 | Van Oosten et al. | |
| 9,410,084 | B2 | 8/2016 | Kuriyama et al. | |
| 9,442,321 | B2 | 9/2016 | Kaneoya et al. | |
| 2005/0008892 | A1* | 1/2005 | Yamamoto ........... | C07D 487/04 428/690 |
| 2007/0010672 | A1 | 1/2007 | Yamamoto et al. | |
| 2008/0143935 | A1 | 6/2008 | Akao et al. | |
| 2008/0180611 | A1 | 7/2008 | Minato et al. | |
| 2009/0173916 | A1 | 7/2009 | Yamamoto et al. | |
| 2011/0094585 | A1 | 4/2011 | Debije et al. | |
| 2011/0149216 | A1 | 6/2011 | Minato et al. | |
| 2012/0320298 | A1 | 12/2012 | Suzuki | |
| 2013/0342773 | A1* | 12/2013 | Chu ...................... | C09K 19/02 349/33 |
| 2014/0138579 | A1 | 5/2014 | Van Oosten et al. | |
| 2015/0232758 | A1 | 8/2015 | Kuriyama et al. | |
| 2015/0309361 | A1 | 10/2015 | Kaneoya et al. | |
| 2016/0075948 | A1 | 3/2016 | Ogawa et al. | |
| 2016/0085108 | A1 | 3/2016 | Junge et al. | |

FOREIGN PATENT DOCUMENTS

| CN | 1771298 | A | 5/2006 |
|---|---|---|---|
| CN | 101206339 | A | 6/2008 |
| CN | 101236267 | A | 8/2008 |
| CN | 102037565 | A | 4/2011 |
| CN | 103429703 | A | 12/2013 |
| CN | 104136971 | A | 11/2014 |
| CN | 104350416 | A | 2/2015 |
| CN | 104620171 | A | 5/2015 |
| CN | 105190419 | A | 12/2015 |
| JP | 2001/505887 | | 5/2001 |
| JP | 2013/521521 | A | 6/2013 |
| JP | 2013/531279 | A1 | 8/2013 |
| WO | 98/25927 | A1 | 6/1998 |
| WO | 2004090046 | A1 | 10/2004 |
| WO | 2009141295 | A1 | 11/2009 |
| WO | 2012095627 | A1 | 7/2012 |

(Continued)

OTHER PUBLICATIONS

International Search Report for PCT/EP2014/003081 dated Mar. 3, 2015.
Debije, M. G. et al., "Solar energy collectors with tunable transmission," Advanced Functional Materials, 2010, vol. 20, pp. 1498-1502.
English Translation of Office Action and Search Report for related Chinese Patent Application No. 201480068766.1 dated Feb. 27, 2017.
Communication from European Patent Office for related Patent Application No. EP14 801 933.4 dated Apr. 10, 2017.

(Continued)

*Primary Examiner* — Chanceity N Robinson
*Assistant Examiner* — Anna Malloy
(74) *Attorney, Agent, or Firm* — Millen White Zelano & Branigan, PC

(57) ABSTRACT

Mixtures containing at least one dye compound having a diketopyrrolopyrrole structure and at least one further liquid-crystalline compound are suitable for use in devices for regulating the entry of light into a space.

17 Claims, No Drawings

(56) References Cited

FOREIGN PATENT DOCUMENTS

WO      2013004677 A1     1/2013
WO      2014180525 A1     11/2014

OTHER PUBLICATIONS

Office Action for related Chinese Patent Application No. 201480068766.1 dated Sep. 11, 2017.
Office Action in the corresponding Japanese Examination Application No. 103144390 dated Jul. 5, 2018.
Nakano et al., Charge injection enhanced by guest material in molecularly doped liquid crystalline thin films, Journal of Applied Physics, 2012, 51 pp. 011701/1-011701/5.
Dutt, Rotational dynamics of nondipolar and dipolar solutes in an isotropic liquid crystal: Comparison with an isotropic iquid, Journal of Chemical Physics, Dec. 8, 2013, vol. 119 (22), pp. 11971-11976.
Edman et al., Polarized Light Spectroscopy of Dihydropyrrolopyrroledione in Liquids and Liquid Crystals: Molecular Confirmation and Influence by an Anisotropic Environment, Journal of Physical Chemistry, 1995, vol. 99(21) pp. 8504-8509.
Office Action for related TW Patent Application No. 103144390 dated Jul. 5, 2018.

\* cited by examiner

DYE COMPOUNDS

The present application relates to a compound of the formula (I) which has a derivatised diketopyrrolopyrrole basic structure. The compound of the formula (I) is suitable for use in a mixture comprising at least one further compound selected from liquid-crystalline compounds. The mixture is preferably used in a device containing a switching layer as material of this switching layer. Particular preference is given to the use in the switching layer of a device for regulating the entry of light into a space.

For the purposes of the present invention, the term light is taken to mean, in particular, electromagnetic radiation in the UV-A, VIS and NIR region. In particular, it is taken to mean light of a wavelength which is only absorbed to a negligible extent or not at all by the materials usually used in windows (for example glass). According to the definitions usually used, the UV-A region is taken to mean a wavelength from 320 nm to 380 nm, the VIS region is taken to mean a wavelength from 380 nm to 780 nm and the NIR region is taken to mean a wavelength from 780 nm to 2000 nm.

For the purposes of the present application, a liquid-crystalline compound is taken to mean a compound which has liquid-crystalline properties under certain conditions. The term liquid-crystalline properties is familiar to the person skilled in the art and is understood as usual in the area of physical chemistry. In the narrower sense, it is taken to mean that the compound is liquid and has direction-dependent properties. The liquid-crystalline properties are typically dependent on the temperature. In the narrower sense, a liquid-crystalline compound is therefore taken to mean a compound which has liquid-crystalline properties in a temperature range which includes room temperature. A liquid-crystalline compound typically has an elongated shape, i.e. it is significantly longer in one or two spatial directions than in the other spatial direction(s).

Compounds having a diketopyrrolopyrrole basic structure have already been known for some time. EP 0094911 describes how diketopyrrolo-pyrrole compounds containing aryl groups as substituents can be prepared efficiently.

Diketopyrrolopyrrole compounds are known as dyes, for example for polymers (EP 0094911). Furthermore, the use of this class of compound as fluorescence markers and as constituents of organic semiconductors and corresponding semiconductor devices is known (WO 2004/090046).

In the area of devices for regulating the entry of light into a space, there is interest in technical solutions with the aid of which durable and high-performance devices can be obtained.

An advantageous approach for these devices is the use of switching layers comprising a mixture of at least one liquid-crystalline compound in combination with at least one dichroic dye. Application of a voltage enables a change in the spatial alignment of the dye molecules to be achieved in these switching layers which effects a change in their absorption and thus in the transmission through the switching layer. A corresponding device is described, for example, in WO 2009/141295.

Rylene dyes have already been described for use in the said devices, for example in WO 2009/141295, WO 2013/004677 and WO 2014/090373.

There continues to be a need for improvement with respect to the mixtures for use in the said switching layers, in particular with respect to light stability, long-term stability of the solution and high degree of anisotropy of the absorption. It is furthermore highly relevant for certain applications that the mixtures have high fluorescence intensity. It is still furthermore desirable for the development of the technology to have alternatives to the known dyes available.

In the course of investigations into suitable dye compounds, it has surprisingly now been found that one or more of the above-mentioned technical objects are achieved by a liquid-crystalline mixture comprising a diketo-pyrrolopyrrole derivative.

The present invention thus relates to a mixture comprising at least one compound of the formula (I)

formula (I)

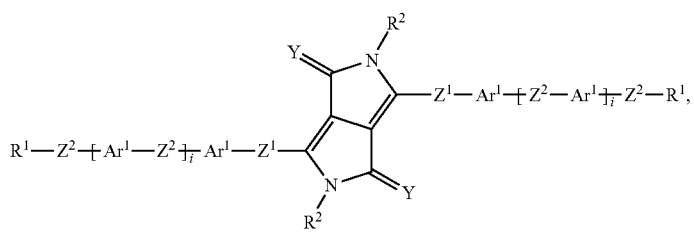

where the following applies to the symbols occurring:

$Y$ is on each occurrence, identically or differently, O or $NR^Y$;

$Z^1$ is on each occurrence, identically or differently, a single bond or a group selected from $-CR^3=CR^3-$ and $-C\equiv C-$, or two, three, four or five groups selected from the said groups combined with one another;

$Z^2$ is on each occurrence, identically or differently, a single bond or a group selected from O, S, $-C(R^3)_2-$, $-C(R^3)_2-O-$, $-OC(R^3)_2-$, $-CR^3=CR^3-$ and $-C\equiv C-$, or two, three, four or five groups selected from the said groups combined with one another;

$Ar^1$ is on each occurrence, identically or differently, an aryl or heteroaryl group having 5 to 30 aromatic ring atoms, which may be substituted by one or more radicals $R^4$;

$R^Y$, $R^1$, $R^2$, $R^3$, $R^4$ are on each occurrence, identically or differently, H, D, F, Cl, CN, $N(R^5)_2$, an alkyl, alkoxy or thioalkoxy group having 1 to 15 C atoms or an alkenyl or alkynyl group having 2 to 15 C atoms, where the above-mentioned groups may each be substituted by one or more radicals $R^5$ and where one or more $CH_2$ groups in the above-mentioned groups may be replaced by $-R^5C=CR^5-$, $-C\equiv C-$, $C=O$, $C=S$, $-C(=O)O-$, $-O(C=O)-$, $Si(R^5)_2$, $NR^5$, $-O-$ or $-S-$, or an aryl or heteroaryl group having 5 to 30 aromatic ring atoms, which may in each case be substituted by one or more radicals $R^5$;

$R^5$ is on each occurrence, identically or differently, H, D, F, Cl, CN, $N(R^6)_2$, an alkyl, alkoxy or thioalkoxy group having 1 to 15 C atoms or an alkenyl or alkynyl group having 2 to 15 C atoms, where the above-mentioned groups may each be substituted by one or more radicals $R^6$ and where one or more $CH_2$ groups in the above-mentioned groups may be replaced by —$R^6C$=$CR^6$—, —C≡C—, C=O, C=S, —C(=O)O—, —O(C=O)—, $Si(R^6)_2$, $NR^6$, —O— or —S—, or an aryl or heteroaryl group having 5 to 30 aromatic ring atoms, which may in each case be substituted by one or more radicals $R^6$;

$R^6$ is on each occurrence, identically or differently, H, F or an aliphatic organic radical having 1 to 20 C atoms, in which one or more H atoms may be replaced by F, or an aryl or heteroaryl group having 5 to 20 C atoms, in which one or more H atoms may be replaced by F;

i is on each occurrence, identically or differently, 0, 1, 2, 3 or 4;

and at least one further compound selected from liquid-crystalline compounds.

The mixtures are distinguished by one or more desirable properties selected from light stability, long-term stability of the solution, high degree of anisotropy of the absorption and high fluorescence intensity.

If i is greater than 1, the groups within the brackets may be identical or different.

If i is equal to 0, the group within the brackets is absent, and the groups $Ar^1$ and $Z^2$ are connected directly to one another.

The formulation "two, three, four or five groups selected from the groups . . . combined with one another" in the sense of the present application is taken to mean that the groups are bonded to one another, preferably in the form of a chain in which two, three, four or five of the groups are bonded to one another. Preference is given to a combination of precisely two or three groups. The groups can generally be identical or different.

An aryl group in the sense of this invention contains 6 to 30 aromatic ring atoms; a heteroaryl group in the sense of this invention contains 5 to 30 aromatic ring atoms, at least one of which is a heteroatom. The heteroatoms are preferably selected from N, O and S. This represents the basic definition. If other preferences are indicated in the description of the present invention, for example with respect to the number of aromatic ring atoms or the heteroatoms present, these apply.

An aryl group or heteroaryl group here is taken to mean either a simple aromatic ring, i.e. benzene, or a simple heteroaromatic ring, for example pyridine, pyrimidine or thiophene, or a condensed (annellated) aromatic or heteroaromatic polycycle, for example naphthalene, phenanthrene, quinoline or carbazole. A condensed (annellated) aromatic or heteroaromatic polycycle in the sense of the present application consists of two or more simple aromatic or heteroaromatic rings condensed with one another. A polycycle of this type may also contain individual non-conjugated units, as in the case, for example, of the fluorene basic structure.

An aryl or heteroaryl group, which may in each case be substituted by the above-mentioned radicals and which may be linked to the aromatic or heteroaromatic ring system via any desired positions, is taken to mean, in particular, groups derived from benzene, naphthalene, anthracene, phenanthrene, pyrene, dihydropyrene, chrysene, perylene, fluoranthene, benzanthracene, benzophenanthrene, tetracene, pentacene, benzopyrene, fluorene, spirobifluorene, furan, benzofuran, isobenzofuran, dibenzofuran, thiophene, benzothiophene, isobenzothiophene, dibenzothiophene, selenophene, benzoselenophene, dibenzoselenophene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenanthrimidazole, pyridimidazole, pyrazinimidazole, quinoxalinimidazole, oxazole, benzoxazole, naphthoxazole, anthroxazole, phenanthroxazole, isoxazole, 1,2-thiazole, 1,3-thiazole, benzothiazole, pyridazine, benzopyridazine, pyrimidine, benzopyrimidine, quinoxaline, pyrazine, phenazine, naphthyridine, azacarbazole, benzocarboline, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole, 1,2,4,5-tetrazine, 1,2,3,4-tetrazine, 1,2,3,5-tetrazine, purine, pteridine, indolizine and benzothiadiazole.

For the purposes of the present invention, an alkyl group having 1 to 15 C atoms or an alkenyl or alkynyl group having 2 to 15 C atoms, in which, in addition, individual H atoms or $CH_2$ groups may be substituted by the groups mentioned above under the definition of the radicals, is preferably taken to mean the radicals methyl, ethyl, n-propyl, i-propyl, n-butyl, i-butyl, s-butyl, t-butyl, 2-methylbutyl, n-pentyl, s-pentyl, cyclopentyl, neopentyl, n-hexyl, cyclohexyl, neohexyl, n-heptyl, cycloheptyl, n-octyl, cyclooctyl, 2-ethylhexyl, trifluoromethyl, pentafluoroethyl, 2,2,2-trifluoroethyl, ethenyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl or octynyl.

An alkoxy or thioalkoxy group having 1 to 15 C atoms is preferably taken to mean methoxy, trifluoromethoxy, ethoxy, n-propoxy, i-propoxy, n-butoxy, i-butoxy, s-butoxy, t-butoxy, n-pentoxy, s-pentoxy, 2-methylbutoxy, n-hexoxy, cyclohexyloxy, n-heptoxy, cycloheptyloxy, n-octyloxy, cyclooctyloxy, 2-ethylhexyloxy, pentafluoroethoxy, 2,2,2-trifluoroethoxy, methylthio, ethylthio, n-propylthio, i-propylthio, n-butylthio, i-butylthio, s-butylthio, t-butylthio, n-pentylthio, s-pentylthio, n-hexylthio, cyclohexylthio, n-heptylthio, cycloheptylthio, n-octylthio, cyclooctylthio, 2-ethylhexylthio, trifluoromethylthio, pentafluoroethylthio, 2,2,2-trifluoroethylthio, ethenylthio, propenylthio, butenylthio, pentenylthio, cyclopentenylthio, hexenylthio, cyclohexenylthio, heptenylthio, cycloheptenylthio, octenylthio, cyclooctenylthio, ethynylthio, propynylthio, butynylthio, pentynylthio, hexynylthio, heptynylthio or octynylthio.

An aliphatic organic radical having 1 to 20 C atoms is in principle taken to mean any desired organic radical which is not aromatic or heteroaromatic.

It is preferably taken to mean alkyl groups having 1 to 15 C atoms, alkoxy groups having 1 to 15 C atoms or alkenyl or alkynyl groups having 2 to 15 C atoms, as described in greater detail above.

According to a preferred embodiment, Y is equal to O.

Furthermore, $Z^1$ is preferably on each occurrence, identically or differently, a single bond or a group selected from —$CR^3$=$CR^3$— and —C≡C—. $Z^1$ is particularly preferably a single bond. Compounds of the formula (I) having this feature result in devices having a particularly long operating lifetime.

$Z^2$ is preferably on each occurrence, identically or differently, a single bond or a group selected from O, S, $C(R^3)_2$, —$C(R^3)_2O$—, —$OC(R^3)_2$—, —$CR^3$=$CR^3$— and —C≡C—, particularly preferably a single bond or a group selected from —$CH_2CH_2$—, —$CF_2CF_2$—, —$OCH_2$—, —$OCF_2$—, —$CH_2O$—, —$CF_2O$—, —CH=CH—, —CF=CF— and —C≡C—, and most preferably a single bond. Compounds of the formula (I) having this feature result in particularly stable devices.

$Ar^1$ is preferably on each occurrence, identically or differently, an aryl group having 6 to 18 aromatic ring atoms, which may be substituted by one or more radicals $R^4$, or a heteroaryl group having 5 to 18 aromatic ring atoms, which may be substituted by one or more radicals $R^4$. $Ar^1$ is particularly preferably on each occurrence, identically or differently, an aryl group having 6 to 13 aromatic ring atoms, which may be substituted by one or more radicals $R^4$, or a heteroaryl group having 5 to 13 aromatic ring atoms, which may be substituted by one or more radicals $R^4$. $Ar^1$ is very particularly preferably selected on each occurrence, identically or differently, from benzene, fluorene, naphthalene, pyridine, pyrimidine, pyrazine, triazine, thiophene, benzothiophene, dibenzothiophene, furan, benzofuran, dibenzofuran, indole, carbazole, thiazole, benzothiazole and quinoline, each of which may be substituted by one or more radicals $R^4$.

$R^Y$ is preferably equal to CN.

$R^1$ is preferably on each occurrence, identically or differently, H, F, CN, $N(R^5)_2$ or a straight-chain alkyl or alkoxy group having 1 to 15 C atoms, which may be substituted by one or more radicals $R^5$, or a branched alkyl or alkoxy group having 3 to 15 C atoms, which may be substituted by one or more radicals $R^5$, or a cyclic alkyl group having 4 to 8 C atoms, which may be substituted by one or more radicals $R^5$, where one or more $CH_2$ groups in the alkyl and alkoxy groups may be replaced by —O— or —S—. $R^1$ is particularly preferably on each occurrence, identically or differently, F or a straight-chain alkyl or alkoxy group having 3 to 12 C atoms, which may be substituted by one or more radicals $R^5$, or a branched alkyl or alkoxy group having 3 to 12 C atoms, which may be substituted by one or more radicals $R^5$, or a cyclic alkyl group having 6 C atoms, which may be substituted by one or more radicals $R^5$, where one or more $CH_2$ groups in the alkyl and alkoxy groups may be replaced by —O— or —S—. $R^1$ is most preferably on each occurrence, identically or differently, a straight-chain alkyl group having 3 to 12 C atoms, which may be substituted by one or more radicals $R^5$, or a branched alkyl group having 3 to 12 C atoms, which may be substituted by one or more radicals $R^5$, or a cyclic alkyl group having 6 C atoms, which may be substituted by one or more radicals $R^5$, where one or more $CH_2$ groups in the alkyl and alkoxy groups may be replaced by —O— or —S—. Such embodiments of the compound of the formula (I) are distinguished by excellent solubility in mixtures comprising at least one liquid-crystalline compound.

$R^2$ is preferably on each occurrence, identically or differently, H, an alkyl group having 1 to 15 C atoms, which may be substituted by one or more radicals $R^5$, or an aryl or heteroaryl group having 5 to 18 aromatic ring atoms, which may be substituted by one or more radicals $R^5$. $R^2$ is particularly preferably on each occurrence, identically or differently, an alkyl group having 1 to 12 C atoms, which may be substituted by one or more radicals $R^5$, very particularly preferably a branched alkyl group having 3 to 12 C atoms, which may be substituted by one or more radicals $R^5$.

$R^3$ is preferably on each occurrence, identically or differently, H, F, or an alkyl group having 1 to 15 C atoms, which may be substituted by one or more radicals $R^5$. $R^3$ is particularly preferably on each occurrence, identically or differently, H or F.

$R^4$ is preferably on each occurrence, identically or differently, H, D, F, CN, or an alkyl or alkoxy group having 1 to 15 C atoms, which may be substituted by one or more radicals $R^5$. $R^4$ is particularly preferably on each occurrence, identically or differently, H, F or CN.

$R^5$ is on each occurrence, identically or differently, H, F, CN, or an alkyl or alkoxy group having 1 to 15 C atoms, which may be substituted by one or more radicals $R^6$, or an aryl or heteroaryl group having 5 to 18 aromatic ring atoms, which may in each case be substituted by one or more radicals $R^6$.

The index i is preferably on each occurrence, identically or differently, 1 or 2, particularly preferably 1. Compounds of this type are distinguished by good alignment relative to the liquid-crystalline compound in the mixture and high anisotropy of the absorption. Furthermore, they have good solubility and a high coefficient of extinction.

The index i is furthermore preferably selected identically on each occurrence.

Preferred compounds of the formula (I) in the mixture according to the invention are selected from compounds of the formulae (I-1) to (I-2)

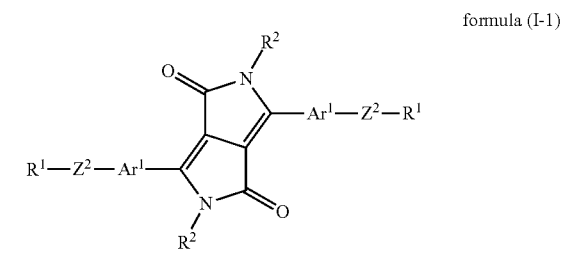

formula (I-1)

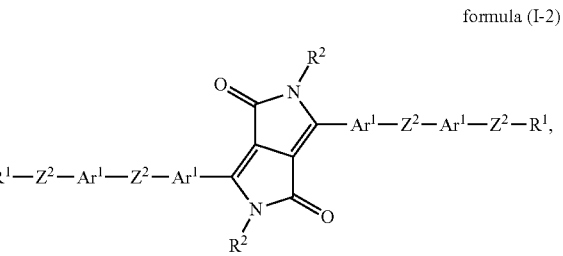

formula (I-2)

where the radicals occurring are as defined above and preferably correspond to the preferred embodiments indicated above.

For compounds of the formula (I-1) or (I-2), $R^2$ is particularly preferably selected on each occurrence, identically or differently, from an alkyl group having 1 to 12 C atoms, which may be substituted by one or more radicals $R^5$, very particularly preferably from a branched alkyl group having 3 to 12 C atoms, which may be substituted by one or more radicals $R^5$.

$Ar^1$ is furthermore preferably selected on each occurrence, identically or differently, from benzene, fluorene, naphthalene, pyridine, pyrimidine, pyrazine, triazine, thiophene, benzothiophene, dibenzothiophene, furan, benzofuran, dibenzofuran, indole, carbazole, thiazole, benzothiazole and quinoline, each of which may be substituted by one or more radicals $R^4$.

Preferred compounds of the formulae (I-1) and (I-2) conform to the following formulae (I-1-1) to (I-1-6) and (I-2-1) to (I-2-4):

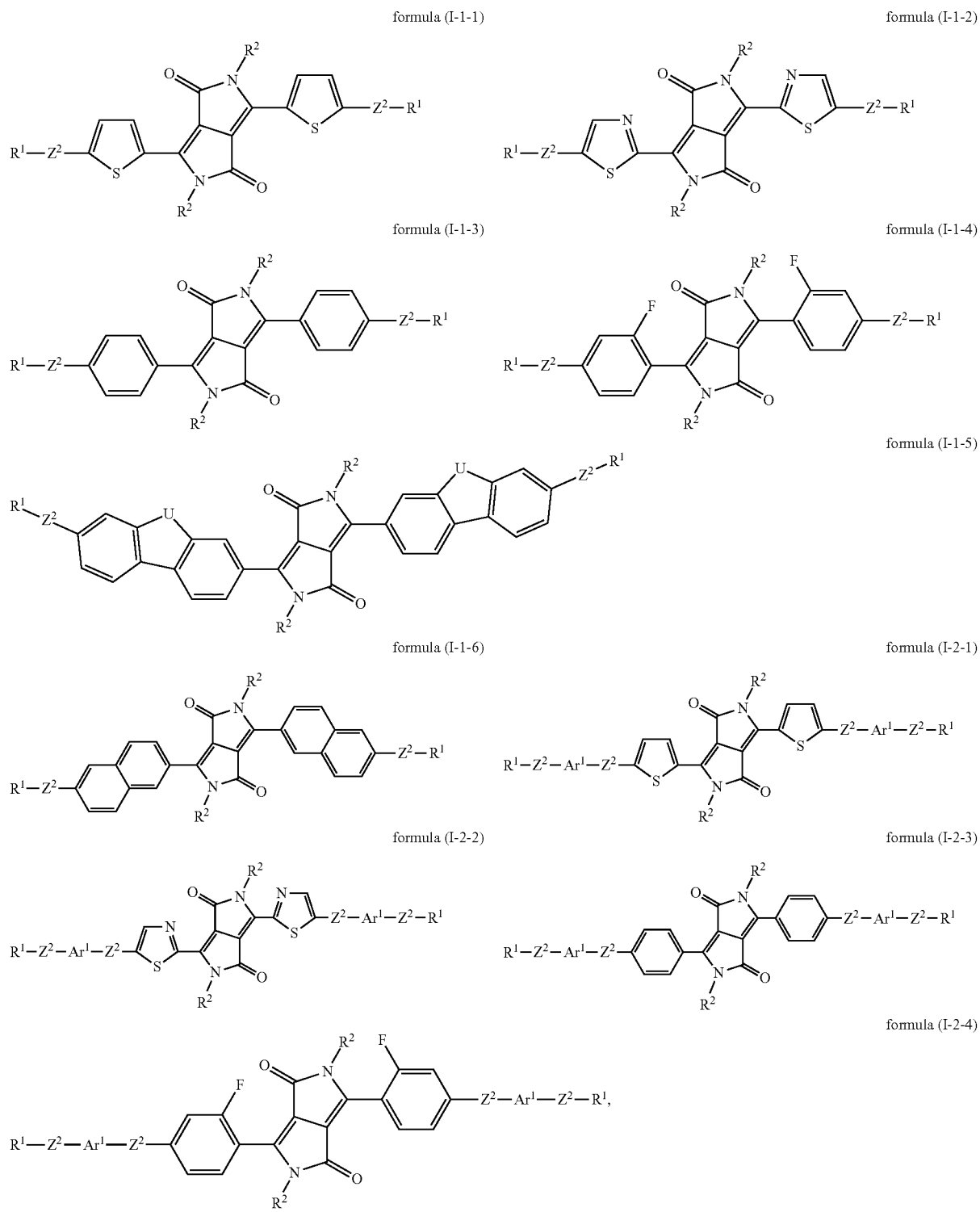

where the symbols occurring are as defined above and U is selected on each occurrence, identically or differently, from C=O and C(R⁴)₂ and is preferably C(R⁴)₂. Furthermore, the symbols occurring preferably correspond to their preferred embodiments indicated above.

For compounds of the formulae (I-1-1) to (I-1-6) and (I-2-1) to (I-2-4), R² is particularly preferably selected on each occurrence, identically or differently, from an alkyl group having 1 to 12 C atoms, which may be substituted by one or more radicals R⁵, very particularly preferably from a branched alkyl group having 3 to 12 C atoms, which may be substituted by one or more radicals R⁵.

For the said compounds, Ar¹ is furthermore preferably selected on each occurrence, identically or differently, from benzene, fluorene, naphthalene, pyridine, pyrimidine, pyrazine, triazine, thiophene, benzothiophene, dibenzothiophene, furan, benzofuran, dibenzofuran, indole, carbazole, thiazole, benzothiazole and quinoline, each of which may be substituted by one or more radicals $R^4$.

For the purposes of the present application, preferred embodiments of the compounds of the formula (I) are generally preferably combined with one another.

Compounds of the formula (I-1-5), as defined above, are novel compounds and as such are the subject-matter of the present application. For compounds of the formula (I-1-5), it is preferred that U is equal to $C(R^4)_2$;

$Z^2$ is on each occurrence, identically or differently, a single bond or a group selected from O, S, $C(R^3)_2$, —$C(R^3)_2$O—, —$OC(R^3)_2$—, —$CR^3$=$CR^3$— and —C≡C—, and particularly preferably a single bond or a group selected from —$CH_2CH_2$—, —$CF_2CF_2$—, —$OCH_2$—, —$OCF_2$—, —$CH_2O$—, —$CF_2O$—, —CH=CH—, —CF=CF— and —C≡C—, and most preferably a single bond;

$R^1$ is on each occurrence, identically or differently, F or a straight-chain alkyl or alkoxy group having 3 to 12 C atoms, which may be substituted by one or more radicals $R^5$, or a branched alkyl or alkoxy group having 3 to 12 C atoms, which may be substituted by one or more radicals $R^5$, or a cyclic alkyl group having 6 C atoms, which may be substituted by one or more radicals $R^5$, where one or more $CH_2$ groups in the alkyl and alkoxy groups may be replaced by —O— or —S—;

$R^2$ is on each occurrence, identically or differently, an alkyl group having 1 to 12 C atoms, which may be substituted by one or more radicals $R^5$, particularly preferably a branched alkyl group having 3 to 12 C atoms, which may be substituted by one or more radicals $R^5$.

Examples of compounds of the formula (I) are depicted below:

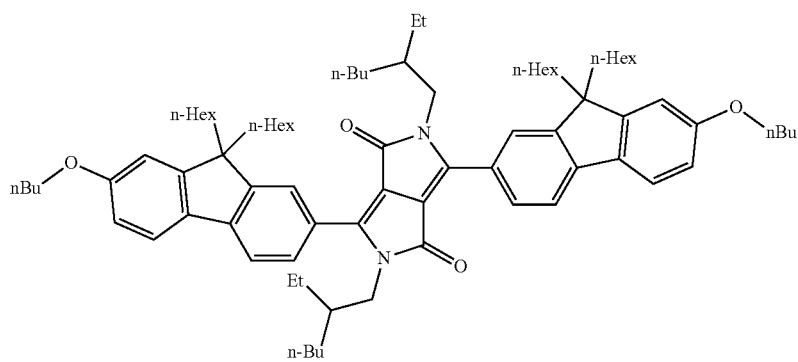

(1)

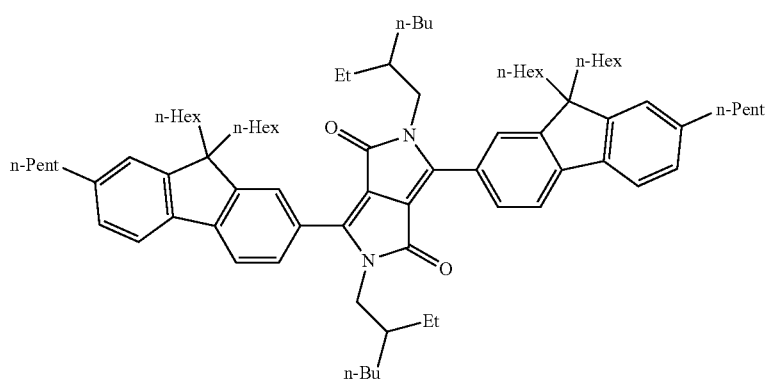

(2)

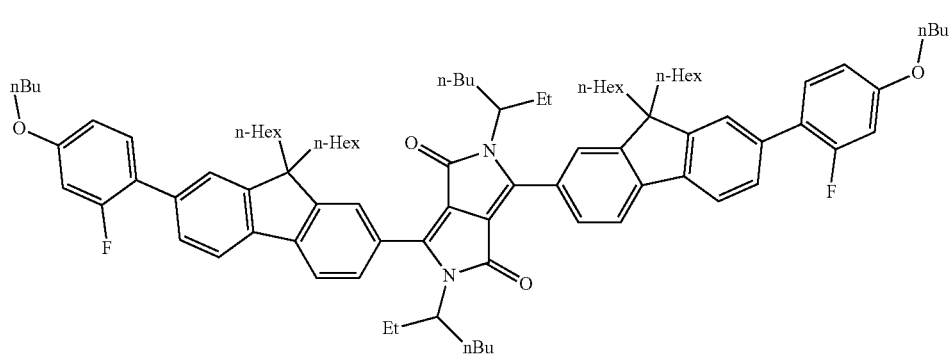

(3)

-continued
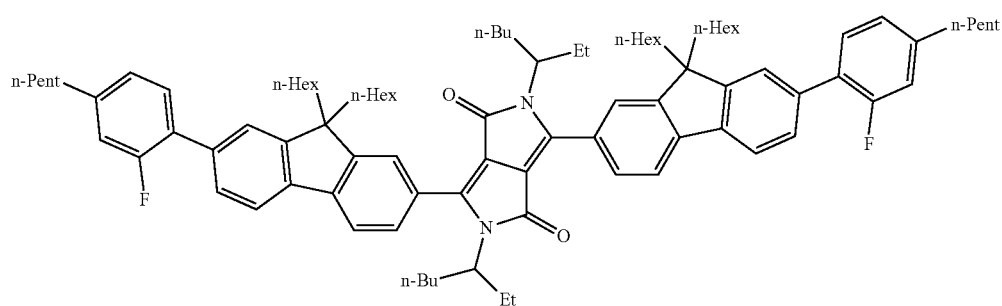
(4)
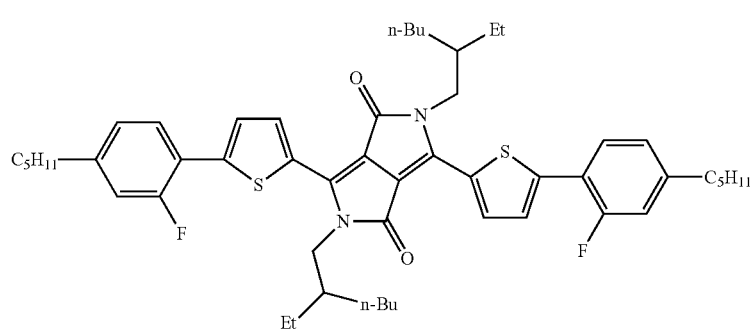
(5)
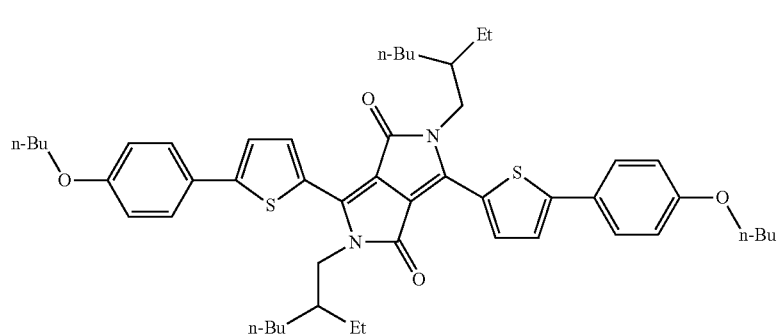
(6)
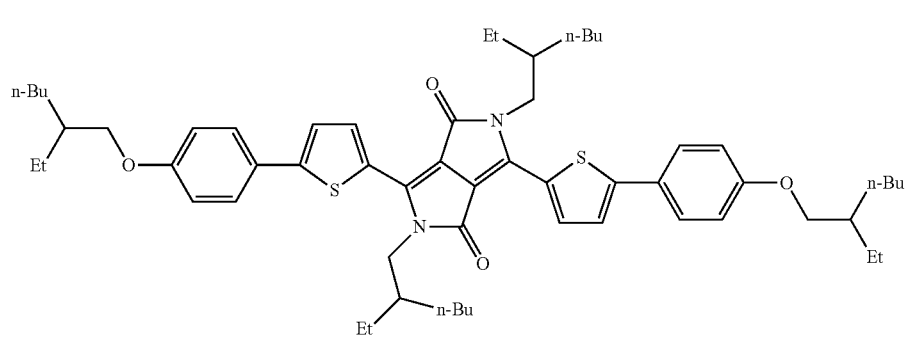
(7)
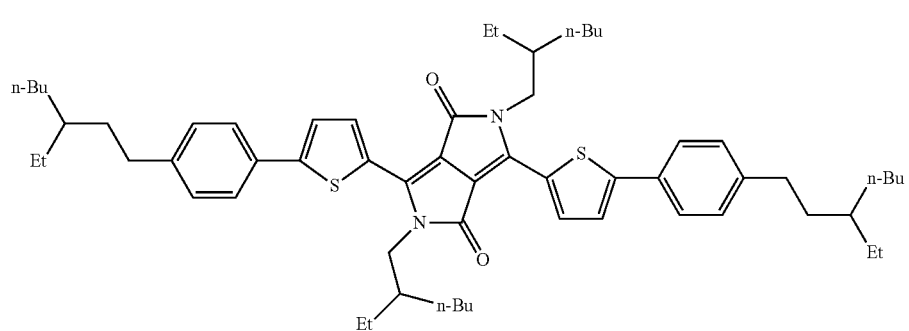
(8)

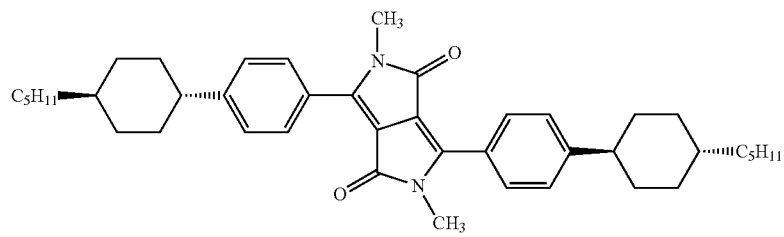
(9)
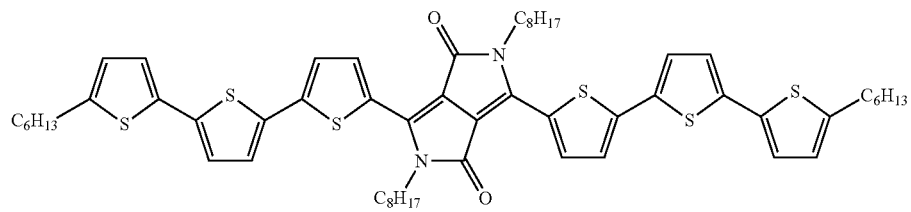
(10)
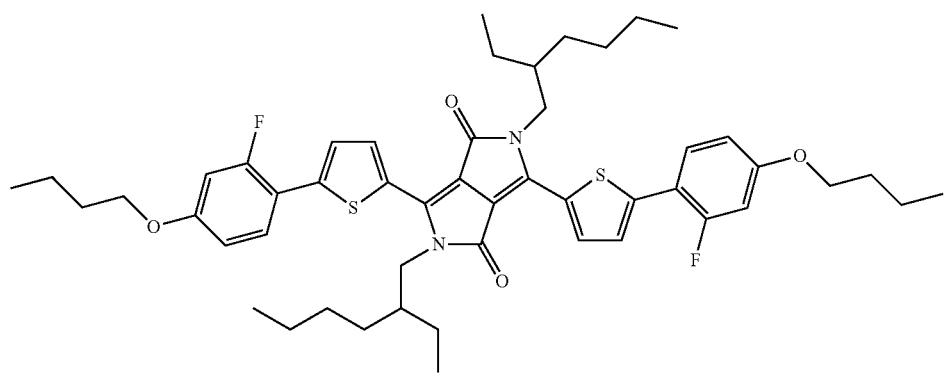
(11)
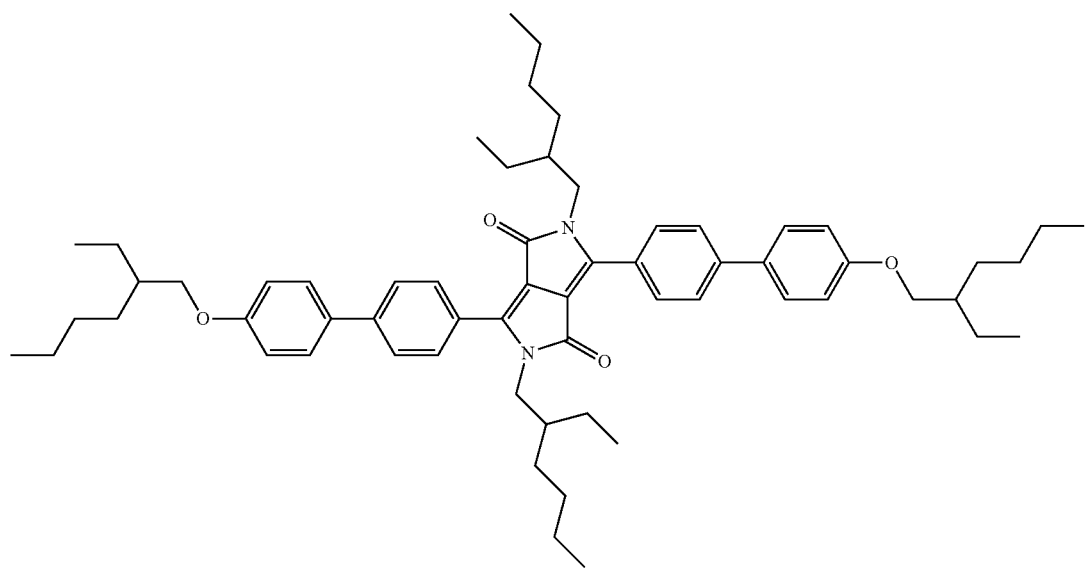
(12)

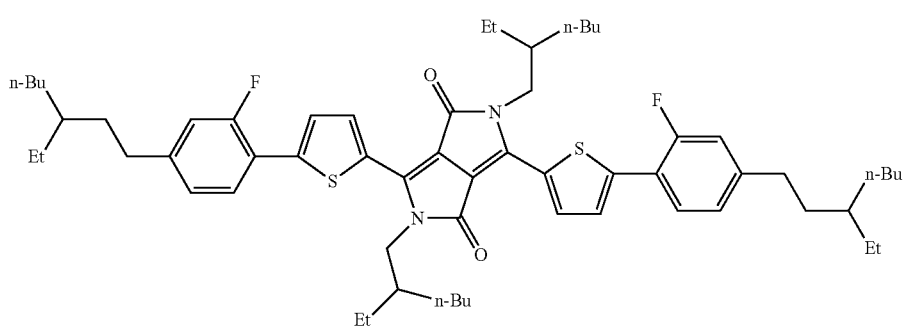

(13)

The compounds of the formula (I) can be prepared by processes which are known to the person skilled in the art. In particular, the person skilled in the art will be able to use the process described in EP 0094911 in order to obtain intermediates of the formula (Int-I)

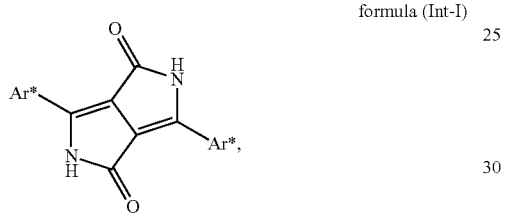

formula (Int-I)

where Ar* is on each occurrence, identically or differently, an aryl or heteroaryl group having 5 to 30 aromatic ring atoms, which may be substituted by any desired organic radicals.

The intermediate of the formula (Int-I) is in a first step reacted further by functionalisation of the amide nitrogen atom, for example by alkylation. In a further optional step, the group Ar* is preferably activated, preferably by introduction of a halogen atom, particularly preferably by bromination, for example using the reagent NBS. A further aryl or heteroaryl group is then introduced via a metal-catalysed coupling reaction, preferably a Suzuki or Ullmann coupling. Further functionalisation reactions may optionally follow.

The general process described above is depicted in Scheme 1 below.

Scheme 1

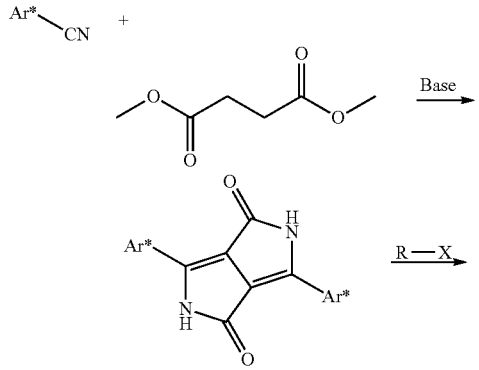

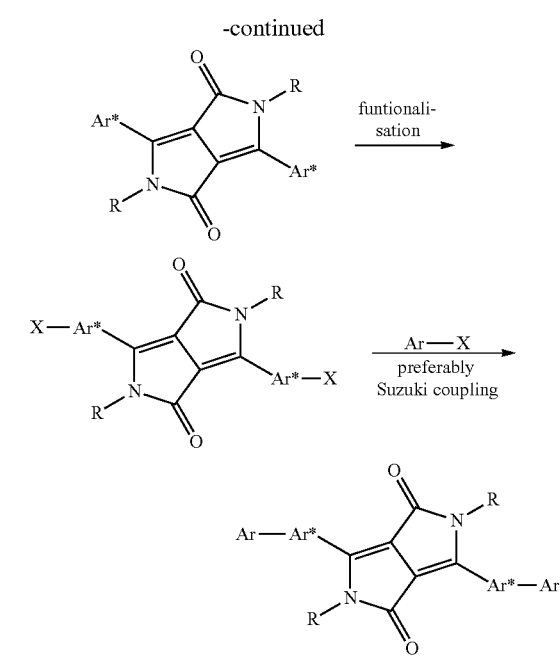

Ar*, Ar: optionally subsituted aryl group or heteroaryl group
R     any desired organic radical
X     reactive group, preferably halogen, particularly preferably bromine In a variant of the process (Scheme 2), one equivalent of each of two different aryl cyanides is employed in the first step instead of two equivalents of the same aryl cyanide. This enables asymmetrical compounds of the formula (I) to be obtained, i.e. compounds in which two different aryl or heteroaryl groups are bonded to the central diketopyrrolopyrrole unit.

Scheme 2

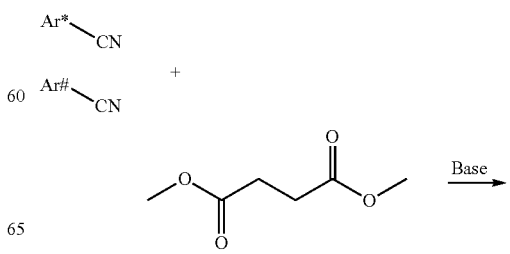

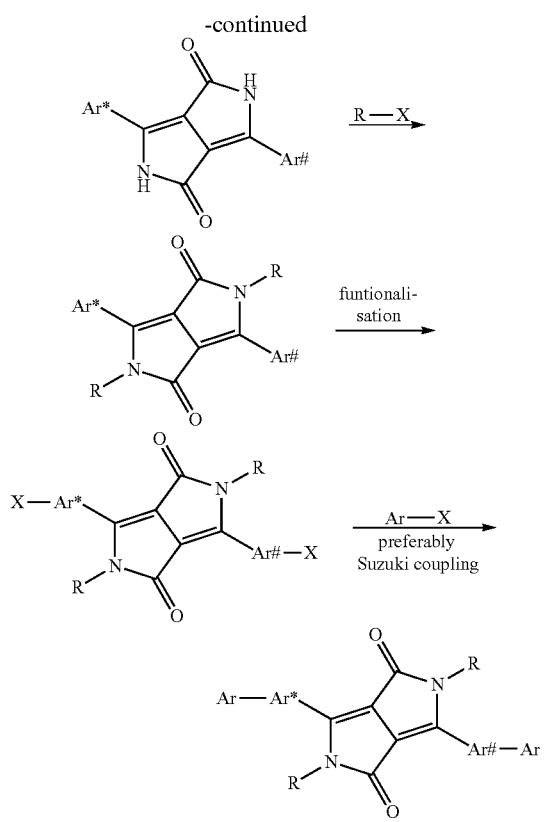

Ar*, Ar#, Ar: optionally subsituted aryl group or heteroaryl group
R        any desired organic radical
X        reactive group, preferably halogen, particularly preferably bromine In a further variant of the synthesis process of Scheme 1, the functionalisation and Suzuki coupling steps are omitted. In this case, precisely the group which was originally introduced as nitrile remains in the compound as side chain.

The compound of the formula (I) is preferably a dye, particularly preferably a dichroic dye. For the purposes of the present application, a dichroic dye is taken to mean a light-absorbent compound in which the absorption properties are dependent on the alignment of the compound to the polarisation direction of the light. A dichroic dye compound in accordance with the present application typically has an elongated shape, i.e. the compound is significantly longer in one spatial direction (longitudinal axis) than in the other two spatial directions.

The compound of the formula (I) is preferably a positively dichroic dye, i.e. a dye which has a positive degree of anisotropy R. The degree of anisotropy R is particularly preferably greater than 0.4, very particularly preferably greater than 0.6 and most preferably greater than 0.7. R is determined by a method familiar to the person skilled in the art. It is disclosed in detail in the application WO 2014/090367.

The absorption preferably reaches a maximum when the polarisation direction of the light is parallel to the direction of the longest elongation of the molecule of the formula (I) and reaches a minimum when the polarisation direction of the light is perpendicular to the direction of the longest elongation of the molecule of the formula (I).

The compound of the formula (I) is furthermore preferably a fluorescent dye. Fluorescence here is taken to mean that a compound is placed in an electronically excited state by absorption of light of a certain wavelength, where the compound subsequently undergoes a transition into the ground state with emission of light. The emitted light preferably has a longer wavelength than the absorbed light. The transition from the excited state into the ground state is furthermore preferably spin-allowed, i.e. takes place without a change in the spin. Furthermore preferably, the lifetime of the excited state of the fluorescent compound is shorter than $10^{-5}$ s, particularly preferably shorter than $10^{-6}$ s, very particularly preferably between $10^{-9}$ and $10^{-7}$ s.

The mixture according to the invention preferably comprises precisely one, two, three or four different compounds of the formula (I), particularly preferably two or three.

Each individual compound of the formula (I) is preferably present in the mixture according to the invention in a proportion of 0.01 to 10% by weight, particularly preferably 0.05 to 7% by weight and very particularly preferably 0.1 to 7% by weight.

The mixture according to the invention comprises at least one further compound selected from liquid-crystalline compounds. It preferably comprises 3 to 25 different liquid-crystalline compounds, preferably 8 to 18, particularly preferably 12 to 16 different liquid-crystalline compounds.

The further compounds selected from liquid-crystalline compounds preferably represent the principal component of the mixture. Taken together, they are particularly preferably present in the mixture in a proportion of 90 to 99.99% by weight, particularly preferably 93 to 99.9% by weight and very particularly preferably 95 to 99.8% by weight.

The compound of the formula (I) is preferably present in the mixture according to the invention in solution. It is preferably influenced in its alignment by the alignment of the liquid-crystalline compounds.

The mixture according to the invention is preferably a liquid-crystalline material. The mixture according to the invention is furthermore preferably a thermotropic liquid-crystalline material. The mixture according to the invention is preferably not a lyotropic liquid-crystalline material. The mixture according to the invention preferably has a clearing point, particularly preferably a phase transition from a nematic liquid-crystalline state to an isotropic state, in the temperature range from 70° C. to 170° C., preferably from 90° C. to 160° C., particularly preferably from 95° C. to 150° C. and very particularly preferably from 105° C. to 140° C.

Furthermore, the dielectric anisotropy of the mixture according to the invention is preferably greater than 3, particularly preferably greater than 7.

However, the dielectric anisotropy of the mixture according to the invention may also be negative. In this case, it preferably has a value of −0.5 to −10, particularly preferably −1 to −8 and very particularly preferably −2 to −6.

The mixture according to the invention furthermore preferably has an optical anisotropy (Δn) of 0.01 to 0.3, particularly preferably 0.04 to 0.27.

Liquid-crystalline compounds which can be used as constituents of the mixture according to the invention can be selected as desired in accordance with the general expert knowledge of the person skilled in the art.

The mixture according to the invention preferably comprises, as liquid-crystalline compound, one or more compounds which contain a nitrile group. Furthermore, the mixture according to the invention preferably comprises, as liquid-crystalline compound, at least one compound which contains structural elements based on 1,4-phenylenes and 1,4-cyclohexylenes. The mixture according to the invention particularly preferably comprises, as liquid-crystalline compound, at least one compound which contains 2, 3 or 4, particularly preferably 3 or 4, structural elements based on 1,4-phenylenes and 1,4-cyclohexylenes.

The mixture according to the invention furthermore preferably comprises one or more chiral dopants. Chiral dopants are preferably used in the mixture according to the invention in a total concentration of 0.01 to 3% by weight, particularly preferably 0.05 to 1% by weight. In order to obtain high values for the twist on use of the mixture in a device, the total concentration of the chiral dopants may also be selected higher than 3% by weight, preferably up to a maximum of 10% by weight.

According to an alternative, likewise preferred embodiment, the mixture according to the invention comprises no chiral dopants.

The mixture according to the invention furthermore preferably comprises one or more stabilisers. The total concentration of the stabilisers is preferably between 0.00001 and 10% by weight, particularly preferably between 0.0001 and 1% by weight of the mixture.

In addition to the at least one compound of the formula (I) and the at least one liquid-crystalline compound, the mixture according to the invention preferably comprises one or more dye compounds having a different structure than formula (I). It particularly preferably comprises one, two, three or four dye compounds having a different structure than formula (I), very particularly preferably two or three dye compounds having a different structure than formula (I). These dye compounds are preferably dichroic dye compounds. They are furthermore preferably fluorescent dye compounds.

Regarding the property of dichroism, the preferred properties described for the compound of the formula (I) are also preferred for the optional further dye compounds having a different structure than formula (I).

The absorption spectra of the dye compounds of the mixture according to the invention preferably complement one another in such a way that the impression of a black colour arises for the eye. The dye compounds of the mixture according to the invention preferably cover a large part of the visible spectrum. The precise way in which a mixture of dye compounds which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The adjustment of the colour location of a mixture of dye compounds is described in the area of colorimetry. To this end, the spectra of the individual dyes are calculated taking into account the Lambert-Beer law to give an overall spectrum and converted into the corresponding colour locations and luminance values under the associated illumination, for example illuminant D65 for daylight, in accordance with the rules of colorimetry. The position of the white point is fixed by the respective illuminant, for example D65, and is quoted in tables (for example above). reference Different colour locations can be set by changing the proportions of the various dye compounds.

The proportion of all dye compounds in the mixture according to the invention, including the at least one compound of the formula (I), is preferably in total 0.01 to 10% by weight, particularly preferably 0.1 to 7% by weight and very particularly preferably 0.2 to 5% by weight.

The dye compounds having a different structure than formula (I) are preferably selected from the dye classes indicated in B. Bahadur, Liquid Crystals—Applications and Uses, Vol. 3, 1992, World Scientific Publishing, Section 11.2.1, and particularly preferably from the explicit compounds given in the table present therein.

The dye compounds having a different structure than formula (I) are preferably selected from azo compounds, anthraquinones, methine compounds, azomethine compounds, merocyanine compounds, naphthoquinones, tetrazines, perylenes, terrylenes, quaterrylenes, higher rylenes, benzothiadiazoles and pyrromethenes. Of these, particular preference is given to perylenes, terrylenes, benzothiadiazoles and azo dyes.

The said dyes belong to the classes of dichroic dyes which are known to the person skilled in the art and have been described many times in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes are described in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and rylenes are described in EP 2166040, US 2011/0042651, EP 68427, EP 47027, EP 60895, DE 3110960 and EP 698649.

The invention furthermore relates to the use of a mixture comprising at least one compound of the formula (I), as defined above, and at least one further compound selected from liquid-crystalline compounds in a device for regulating the entry of light into a space.

The invention still furthermore relates to a device for regulating the entry of light into a space, comprising the mixture according to the invention.

The mixture according to the invention is preferably present in a layer in the device. This layer is preferably switchable, i.e. represents a switching layer.

In a preferred embodiment, the switching layer of the device according to the invention comprises one or more quencher compounds. This is particularly preferred if the device according to the invention comprises one or more fluorescent dyes in its switching layer.

Quencher compounds are compounds which quench the fluorescence. The quencher compounds can take on the electronic excitation energy of adjacent molecules, such as, for example, fluorescent dyes, in the switching layer and undergo a transition into an electronically excited state in the process. The quenched fluorescent dye is thus converted into the electronic ground state and is thus prevented from emitting fluorescence or undergoing a subsequent reaction. The quencher compound itself returns to the ground state through radiation-free deactivation or by emission of light and is again available for further quenching.

The quencher compound may have various functions in the switching layer of the device according to the invention. Firstly, the quencher compound may contribute to extending the lifetime of a dye system, by deactivation of electronic excitation energy. Secondly, the quencher compound eliminates additional colour effects which may be aesthetically undesired, for example coloured emission in the inside space emanating from the fluorescent dyes in the switching layer.

In order to achieve effective quenching, the quencher compound should be adapted to the respective dye system, in particular the dye absorbing at the longest wavelength in a dye combination. The way to do this is known to the person skilled in the art.

Preferred quencher compounds are described, for example, in Table 8.1 on page 279 in Joseph R. Lakowicz, Principles of Fluorescence Spectroscopy, $3^{rd}$ Edition, 2010, ISBN 10: 0-387-31278-1, Verlag Springer Science+Business Media LLC. Further classes of molecule are familiar to the person skilled in the art, for example under the key words dark quencher or black hole quencher. Examples are azo dyes and aminoanthraquinones. The quencher compounds used in the switching layer of the device according to the invention may also be non-fluorescent dyes or dyes which only fluoresce in the NIR.

In a preferred embodiment of the switching layer according to the invention, any quencher compounds present are selected so that fluorescence in the visible part of the spectrum is suppressed.

The device according to the invention is preferably suitable for regulating the entry of light in the form of light emitted by the sun from the environment into a space. The entry of light to be regulated takes place here from the environment (the outside space) into a space. The space here can be any desired space that is substantially sealed off from the environment, for example a building, a vehicle or a container. The device can generally be used for any desired spaces, particularly if the latter have only limited exchange of air with the environment and have light-transmitting boundary surfaces through which the entry of energy from the outside in the form of light energy can take place. Particularly relevant is the use of the device for spaces which are subjected to strong insolation through light-transmitting areas, for example through window areas.

The invention therefore furthermore relates to the use of the device according to the invention for regulating the entry of light into a space.

In an alternative use, the device is employed for regulating the incidence of light on the eyes, for example in protective goggles, visors or sunglasses, where the device keeps the incidence of light on the eyes low in one switching state and reduces the incidence of light to a lesser extent in another switching state.

The device according to the invention is preferably arranged in an opening of a relatively large two-dimensional structure, where the two-dimensional structure itself only allows slight entry of light or none at all, and where the opening transmits light to a greater extent in relative terms. The two-dimensional structure is preferably a wall or another delimitation of a space from the outside. Furthermore, the two-dimensional structure preferably covers an area of at least equal size, particularly preferably an area at least twice as large as the opening in it in which the device according to the invention is arranged.

The device according to the invention is preferably characterised in that it has an area of at least 0.05 $m^2$, preferably at least 0.1 $m^2$, particularly preferably at least 0.5 $m^2$ and very particularly preferably at least 0.8 $m^2$.

The device according to the invention is switchable. Switching here is taken to mean a change in the passage of light through the device. The device according to the invention is preferably electrically switchable.

If the device is electrically switchable, it preferably comprises two or more electrodes, which are installed on both sides of the switching layer comprising the mixture according to the invention. The electrodes preferably consist of ITO or a thin, preferably transparent metal and/or metal-oxide layer, for example silver or FTO (fluorine-doped tin oxide), or an alternative material known to the person skilled in the art for this use. The electrodes are preferably provided with electrical connections. The voltage is preferably provided by a battery, a rechargeable battery or an external power supply.

The switching operation in the case of electrical switching takes place through alignment of the molecules of the mixture according to the invention by application of voltage.

In a preferred embodiment, the device is converted from a state having high absorption, i.e. low light transmissivity, which is present without voltage, into a state having lower absorption, i.e. higher light transmissivity, by application of a voltage. The mixture according to the invention in the layer in the device is preferably nematic in both states. The voltage-free state is preferably characterised in that the molecules of the mixture, and thus the molecules of the compound of the formula (I), are aligned parallel to the plane of the switching layer. This is preferably achieved by a correspondingly selected alignment layer. The state under voltage is preferably characterised in that the molecules of the mixture, and thus the molecules of the compound of the formula (I), are perpendicular to the plane of the switching layer.

In an alternative embodiment to the embodiment mentioned above, the device is converted from a state having low absorption, i.e. high light transmissivity, which is present without voltage, into a state having higher absorption, i.e. lower light transmissivity, by application of a voltage. The mixture according to the invention in the layer in the device is preferably nematic in both states. The voltage-free state is preferably characterised in that the molecules of the mixture, and thus the molecules of the compound of the formula (I), are aligned perpendicular to the plane of the switching layer. This is preferably achieved by a correspondingly selected alignment layer. The state under voltage is preferably characterised in that the molecules of the mixture, and thus the molecules of the compound of the formula (I), are parallel to the plane of the switching layer.

According to a preferred embodiment of the invention, the device can be operated without an external power supply by providing the energy required by means of a solar cell or another device for the conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably mounted on the outside of the device or is an internal component of the device, as disclosed, for example, in WO 2009/141295. Particular preference is given here to solar cells, which are particularly efficient in the case of diffuse light, and transparent solar cells.

The device according to the invention preferably has the following layer sequence, where further layers may additionally be present. The layers indicated below are preferably directly adjacent to one another in the device:

substrate layer, preferably comprising glass or polymer
electrically conductive transparent layer, preferably comprising ITO
alignment layer
switching layer comprising the mixture according to the invention
alignment layer
electrically conductive transparent layer, preferably comprising ITO
substrate layer, preferably comprising glass or polymer The preferred embodiments of the individual layers are described below.

The device according to the invention preferably comprises one or more, particularly preferably two, alignment layers. The alignment layers are preferably directly adjacent to the two sides of the layer comprising the mixture according to the invention.

The alignment layers used in the device according to the invention can be any desired layers known to the person skilled in the art for this purpose.

Preference is given to polyimide layers, particularly preferably layers comprising rubbed polyimide. Polyimide rubbed in a certain manner known to the person skilled in the art results in alignment of the molecules of the liquid-crystalline medium in the rubbing direction if the molecules are parallel to the alignment layer (planar alignment). It is preferred here for the molecules of the liquid-crystalline medium not to be completely planar on the alignment layer, but instead to have a slight pretilt angle. In order to achieve vertical alignment of the compounds of the liquid-crystalline medium to the surface of the alignment layer (homeotropic alignment), polyimide treated in a certain manner is preferably employed as material for the alignment layer (polyimide for very high pretilt angles). Furthermore, polymers obtained by an exposure process to polarised light can be used as alignment layer in order to achieve alignment of the compounds of the liquid-crystalline medium in accordance with an alignment axis (photo-alignment).

The layer comprising the mixture according to the invention in the device according to the invention is furthermore preferably arranged between two substrate layers or enclosed thereby. The substrate layers can consist, for example, of glass or a polymer, preferably a light-transmitting polymer.

The device is preferably characterised in that it does not comprise a polymer-based polariser, particularly preferably does not comprise a polariser in the solid material phase and very particularly preferably comprises no polariser at all.

However, according to an alternative embodiment, the device may also comprise one or more polarisers. The polarisers in this case are preferably linear polarisers.

If precisely one polariser is present, its absorption direction is preferably perpendicular to the orientation axis of the compounds of the liquid-crystalline medium of the device according to the invention on the side of the switching layer on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

The device according to the invention furthermore preferably comprises an optical waveguide system which transports light to a solar cell or another device for the conversion of light and/or heat energy into electrical energy, preferably as described in WO 2009/141295. The optical waveguide system collects and concentrates light hitting the device. It preferably collects and concentrates light emitted by fluorescent dichroic dyes in the switching layer. The optical waveguide system is in contact with a device for the conversion of light energy into electrical energy, preferably a solar cell, so that the collected light hits the latter in concentrated form. In a preferred embodiment of the invention, the device for the conversion of light energy into electrical energy is mounted at the edge of the device, integrated into the latter and electrically connected to means for the electrical switching of the device according to the invention.

In a preferred embodiment, the device according to the invention is a component of a window, particularly preferably a window comprising at least one glass surface, very particularly preferably a window which comprises multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass surface of a window, particularly preferably in the interspace between two glass panes of multipane insulating glass.

The invention furthermore relates to a window containing a device according to the invention, preferably having the preferred features indicated above.

WORKING EXAMPLES

A) Syntheses of Compounds of the Formula (I)
A-1) Compound F1:
Compound F1 is prepared as shown in the following scheme:

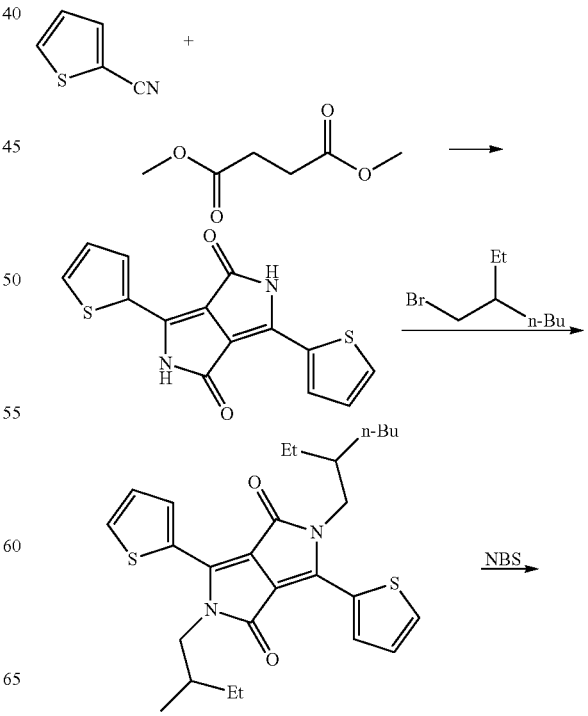

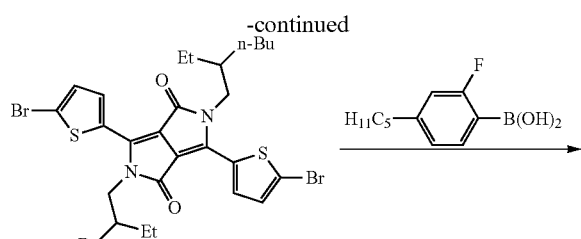

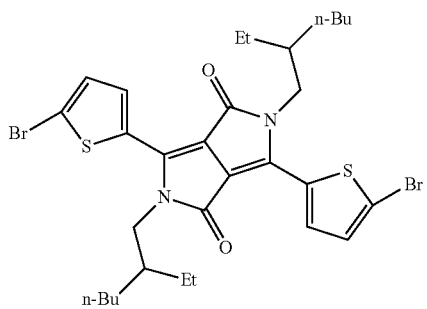

A-2) The following compounds are prepared analogously from the starting material

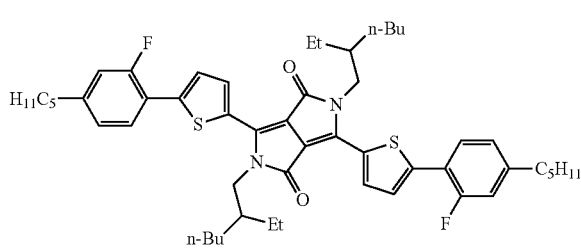

The first three synthesis steps here are carried out as indicated in S. P. Mishra et al, Synthetic Metals, 2010, 2422-2429.

For the final synthesis step, 2.0 g (2.93 mmol) of the diketopyrrolopyrrole precursor and 1.29 g (6.15 mmol) of the boronic acid and 2.84 g of $Na_2CO_3$ are dissolved in a toluene/water mixture. The solution is flushed with Ar and then heated to 50° C. 26.8 mg (0.03 mmol) of $Pd_2(dba)_3$ and 35.7 mg (0.12 mmol) of tris(ortho-tolyl)phosphine are then added in one portion, and the solution is heated to 90° C. under reflux. After a reaction time of one hour, the mixture is worked up by filtration through Celite 545. The solution is washed with water. After removal of the solvent, the crude product is obtained as a dark-green solid. This is recrystallised from toluene, giving the product in a purity of 99.9% (HPLC) and in a yield of 69%.

by reaction with the alternative boronic acid derivatives indicated below:

| Name | Starting material | Yield | Purity |
|---|---|---|---|
| F2 | | 43% | 99.7% (HPLC) |
| F3 | | 51% | 98.1% (HPLC) |
| F3B | | not det. | not det. |

A-3) Compound F3C is prepared analogously to the synthesis of F1 (cf. S. P. Mishra et al, Synthetic Metals, 2010, 2422-2429) by the following synthesis route:

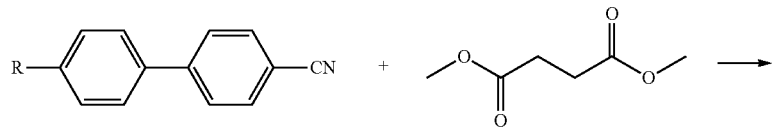

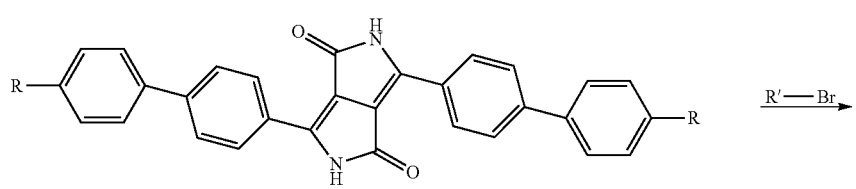

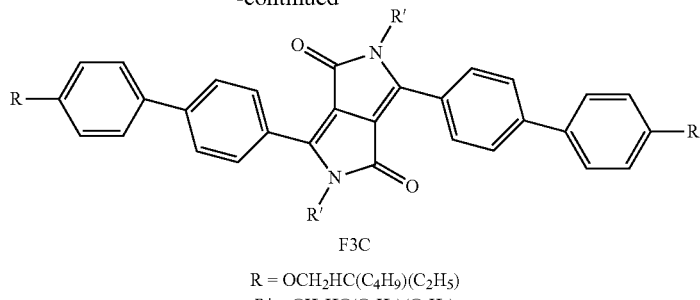

F3C

R = OCH$_2$HC(C$_4$H$_9$)(C$_2$H$_5$)
R' = CH$_2$HC(C$_4$H$_9$)(C$_2$H$_5$)

A-4) Compound F3A is prepared by an analogous synthesis route using

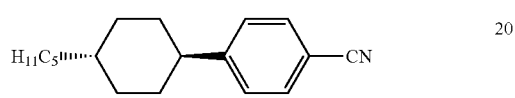

as nitrile component and dimethyl sulfate as alkylating agent in the final step:

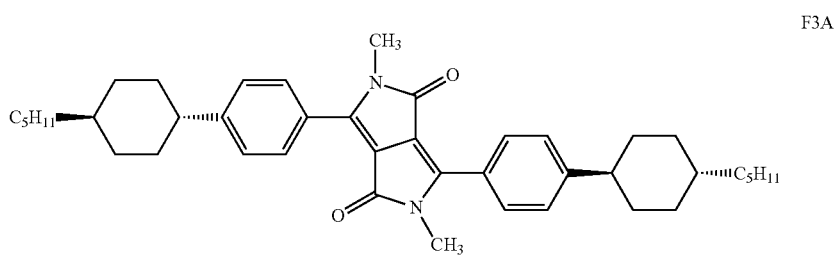

F3A

A-5) The following compound F3D, for example, is commercially available (Aldrich) as a further compound of the formula (I):

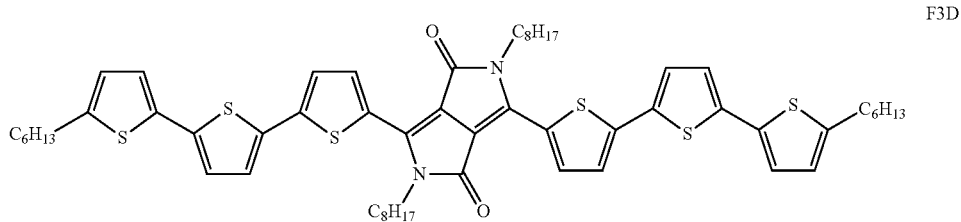

F3D

B) Mixtures Comprising Compounds of the Formula (I) and their Properties

B-1) A solution of each of compounds F1, F2, F3, F3A and F3B in accordance with the invention and a compound F4 as comparison (structures see Table 1) in host mixture H1 (composition see Table 2) was prepared.

TABLE 1
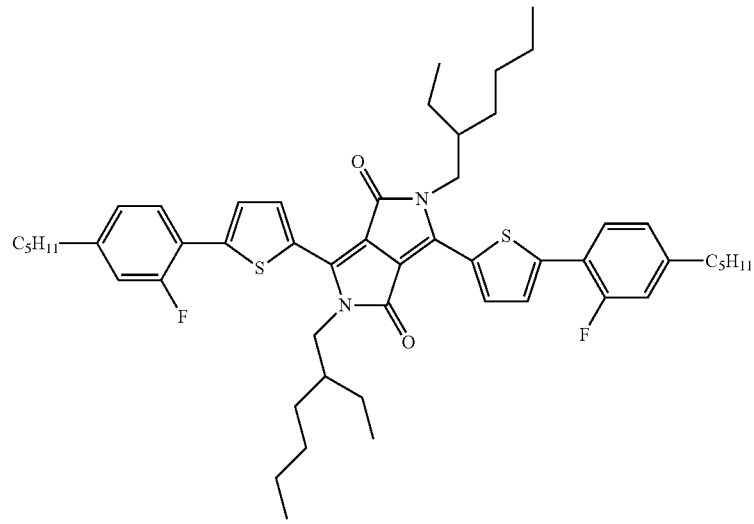
F1
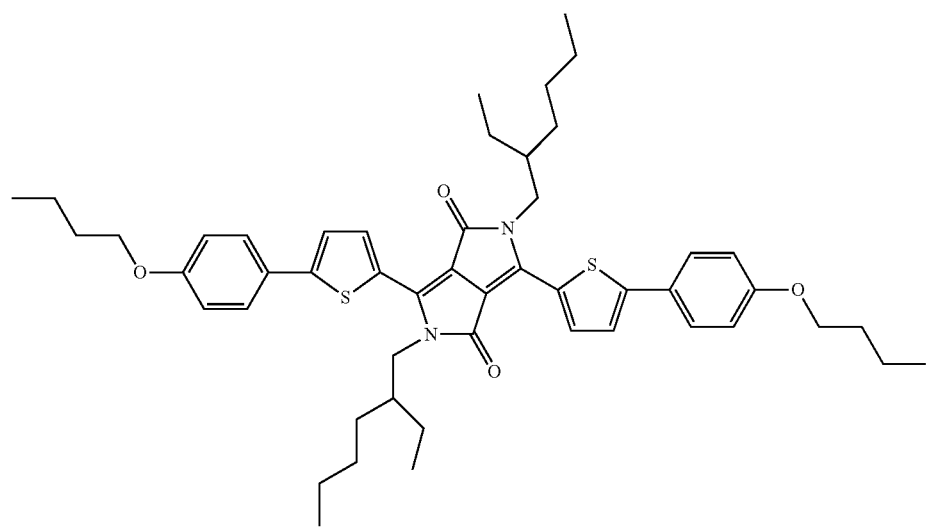 [SMILES: CCCCOc1ccc(-c2ccc(C3=C4C(=O)N(CC(CC)CCCC)C(c5ccc(-c6ccc(OCCCC)cc6)s5)=C4C(=O)N3CC(CC)CCCC)s2)cc1]
F2
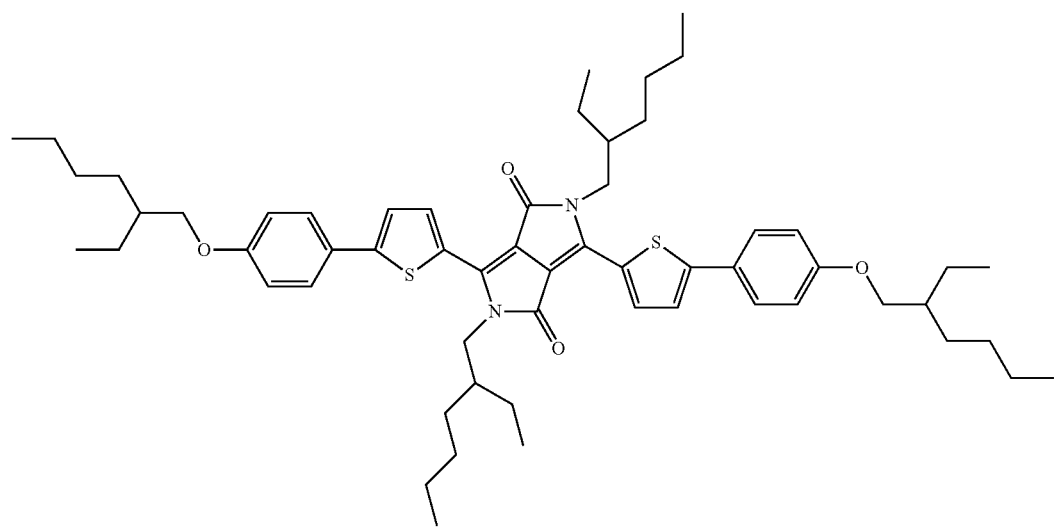 [SMILES: CCCCC(CC)COc1ccc(-c2ccc(C3=C4C(=O)N(CC(CC)CCCC)C(c5ccc(-c6ccc(OCC(CC)CCCC)cc6)s5)=C4C(=O)N3CC(CC)CCCC)s2)cc1]
F3

TABLE 1-continued

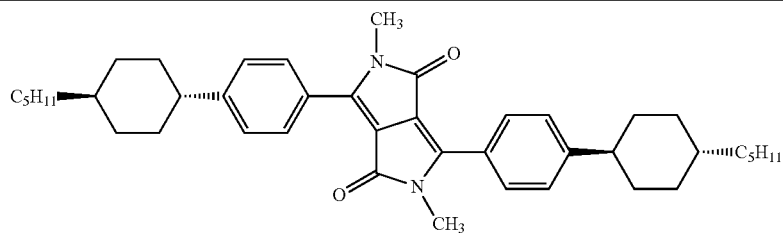

F3A

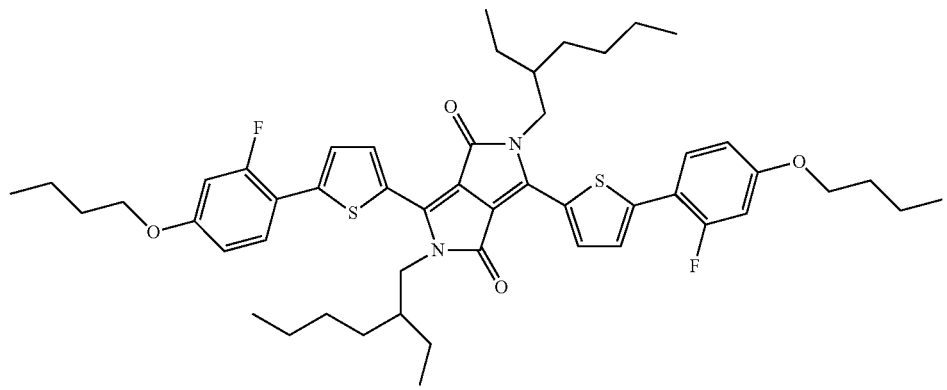 [SMILES: CCCCOc1ccc(-c2ccc(C3=C4C(=O)N(CC(CC)CCCC)C(c5ccc(-c6ccc(OCCCC)cc6F)s5)=C4C(=O)N3CC(CC)CCCC)s2)c(F)c1]

F3B

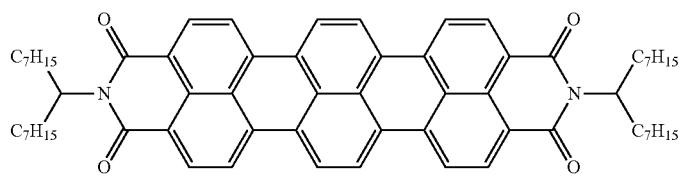

F4

TABLE 2

| Composition | Compound | % |
|---|---|---|
| H1 | CPG-3-F | 5 |
|  | CPG-5-F | 5 |
|  | CPU-3-F | 15 |
|  | CPU-5-F | 15 |
|  | CP-3-N | 16 |
|  | CP-5-N | 16 |
|  | CCGU-3-F | 7 |
|  | CGPC-3-3 | 4 |
|  | CGPC-5-3 | 4 |
|  | CGPC-5-5 | 4 |
|  | CCZPC-3-3 | 3 |
|  | CCZPC-3-4 | 3 |
|  | CCZPC-3-5 | 3 |

The mixtures with dye F1, F2, F3, F3A, F3B or F4 are each characterised with respect to their absorption maximum, their degree of anisotropy of the absorption R, their fluorescence intensity, their light stability and the stability of the solution at high and low temperature.

For the determination of R, a method familiar to the person skilled in the art is used. It is disclosed in detail in WO 2014/090367. For better comparability, the fluorescence intensity (arbitrary units) is determined at a concentration c* of the dye at which a TN cell containing the mixture with a cell thickness of 25 µm has a dark state with 35% transmission. The light stability (fading) is determined by continuous exposure. The stability of the solution is determined by storing a solution of the dye in the concentration indicated until spectroscopically detectable precipitation occurs.

TABLE 3

| Dye in mixture | Absorp. max./nm | Isotropic ext. coeff. $\varepsilon_{iso}$ | Anisotropy R | Fluorescence at c* (a.u.) | Fading (weeks) | Sol. stability +20° C. (weeks at conc.) | Sol. stability −20° C. (weeks at conc.) |
|---|---|---|---|---|---|---|---|
| F1 in H1 | 617 | 810 | 0.78 | 2485 | >29 (98%) | 12 at 2.6% | 12 at 1.5% |
| F2 in H1 | 623 | 877 | 0.78 | 2802 | 17 (80%) | not det. | not det. |
| F3 in H1 | 624 | 770 | 0.74 | 2983 | 10 (80%) | 12 at 1.4% | 12 at 0.8% |
| F3A in H1 | 506 | 628 | 0.41 | not det. | not det. | not det. | not det. |
| F3B in H1 | 620 | 870 | 0.79 | not det. | not det. | not det. | not det. |
| F4 in H1 (comp.) | 657 | 832 | 0.76 | 2360 | 26 (98%) | 8 at 0.4% | 8 at 1.3% |

B-2) Further mixtures according to the invention were prepared. These each comprise one of the dyes F1, F2 and F3 in liquid-crystalline mixture H2 or H3 (composition see Table 4).

TABLE 4

| Composition | H2 | | H3 | |
|---|---|---|---|---|
|  | CY-3-O2 | 12 | CCN-33 | 10 |
|  | CY-5-O2 | 12 | CCN-47 | 10 |
|  | CCY-3-O2 | 13 | CCN-57 | 10 |
|  | CCY-5-O2 | 13 | CY-3-O2 | 5 |
|  | CCY-3-1 | 8 | NCB-53 | 13 |
|  | CCZC-3-3 | 4 | CCY-3-O2 | 5 |

TABLE 4-continued

| H2 | | H3 | |
|---|---|---|---|
| CCZC-3-5 | 3 | CCY-3-O3 | 5 |
| CCZC-4-3 | 3 | CCY-4-O2 | 6 |
| CC-3-4 | 6 | CPY-2-O2 | 9 |
| CC-3-5 | 6 | CPY-3-O2 | 8 |
| CC-3-O3 | 8 | PYP-2-3 | 7 |
| CC-5-O1 | 4 | PYP-2-4 | 6 |
| CC-5-O2 | 4 | CGPC-3-3 | 2 |
| CP-3-O2 | 4 | CGPC-5-3 | 2 |
| | | CGPC-5-5 | 2 |

The following results are obtained for the solubility stability (the data in % here denote % by weight):

TABLE 5

| Dye in mixture | Sol. stability +20° C. (weeks at conc.) | Sol. stability −20° C. (weeks at conc.) |
|---|---|---|
| F1 in H2 | 12 at 1.2% | 12 at 1.4% |
| F3 in H2 | 12 at 0.8% | 12 at 0.9% |
| F1 in H3 | 12 at 2.2% | 12 at 1.7% |
| F3 in H3 | 12 at 1.3% | 12 at 0.8% |

The mixtures comprising dye F1, F2 or F3 are distinguished by very strong fluorescence. Furthermore, they have a high degree of anisotropy and high light and solution stability. This is shown for the three liquid-crystalline mixtures H1, H2 and H3.

Owing to these properties, the compounds are highly suitable for use as liquid-crystalline media in displays or in devices for regulating the entry of light into a space (smart windows).

B-3) As a further investigation method, compounds F1, F3 and F4 were dissolved in liquid-crystalline mixtures H1, H2 and H4 (composition see below). The mixtures obtained were investigated by a new method (spectroscopic investigation of the solubility in supersaturated solutions). The following results were obtained (the data in % here denote % by weight):

| | F4 (comp.) | | F1 | | F3 | |
|---|---|---|---|---|---|---|
| | +20° C. | −20° C. | +20° C. | −20° C. | +20° C. | −20° C. |
| H1 | 0.74% | 1.37% | 2.75% | 1.98% | 2.04% | 1.22% |
| H2 | 0.11% | 0.28% | 1.55% | 2.14% | 1.07% | 1.87% |
| H4 | 0.06% | 0.04% | 1.45% | 1.64% | not det. | not det. |

| | H4 | |
|---|---|---|
| Composition | CY-3-O2 | 9 |
| | CY-3-O4 | 9 |
| | CY-5-O2 | 12 |
| | CY-5-O4 | 8 |
| | CCY-3-O2 | 5 |
| | CCY-3-O3 | 5 |
| | CCY-4-O2 | 5 |
| | CPY-2-O2 | 7 |
| | CPY-3-O2 | 6 |
| | PYP-2-3 | 12 |
| | CCP-V-1 | 6 |
| | CCZPC-3-3 | 3 |
| | CCZPC-3-4 | 3 |
| | CGPC-3-3 | 5 |
| | CGPC-5-3 | 5 |

The results clearly show the advantages of the mixtures according to the invention comprising material F1 or F3 compared with mixtures comprising comparative material F4. In the above table, the lowest value determined for the solubility at 20° C. or at -20° C. in each case denotes the highest concentration that can be employed technically.

In detail, the above results illustrate that F1 and F3 can be employed in significantly higher concentrations in H1 and H2 than F4. In mixture H4, F4 cannot be employed at all, since it has only negligible solubility. By contrast, F1 is soluble in mixture H4 and can thus be employed.

C) Production of Devices According to the Invention (Smart Windows)

Dyes F1, F4, F5 and F6 shown in Table 6 below are dissolved in liquid-crystalline mixture H1 (see above) in the amounts indicated therein.

TABLE 6

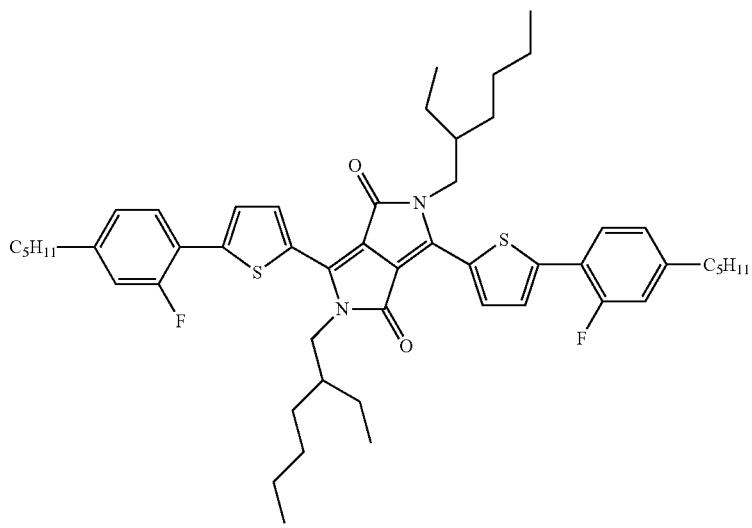

TABLE 6-continued

F1: 0.152% by weight

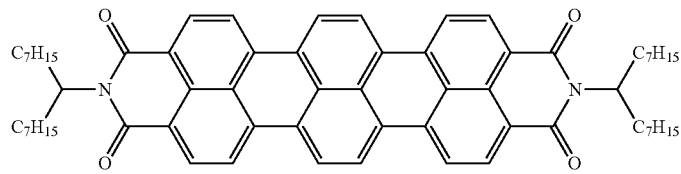

F4: 0.118% by weight

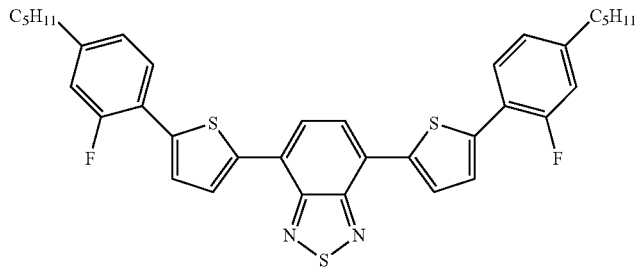

F5: 0.138% by weight

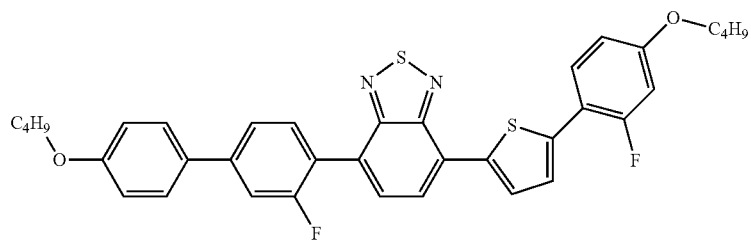

F6: 0.277% by weight

The mixture comprising the four dyes F1, F4, F5 and F6 is introduced into a single host/guest cell, as described in WO 2014/090373. The cell has a thickness of 23.6 μm. The cell is switched from bright to dark, and the light transmissivity $\tau_v$, calculated in accordance with European Standard EN410, equation (1), is determined for both states. The colour location of the device is also determined in CIE x,y coordinates.

Furthermore, the mixture comprising the four dyes F1, F4, F5 and F6 is introduced into a host/guest double cell, as described in the as yet unpublished application EP13002445.8. The cell has a thickness of 23.6 μm. The same parameters are determined as for the single host/guest cell.

The results of the measurements are summarised in Table 7 below.

TABLE 7

|  | State | CIE x | CIE y | $\tau_v$ |
|---|---|---|---|---|
| Single cell | dark | 0.311 | 0.333 | 51.8% |
|  | bright | 0.313 | 0.331 | 84.3% |
| Double cell | dark | 0.306 | 0.345 | 16.3% |
|  | bright | 0.312 | 0.332 | 71.1% |

The results show that the dye mixture according to the invention enables the production of devices for regulating the entry of light into a space which have a high range of light transmission on switching from bright to dark, combined with a virtually ideal colour location (black/white).

The invention claimed is:

1. A mixture comprising one or more compounds selected from compounds (5), (6), (7), (8), (11), and (13):

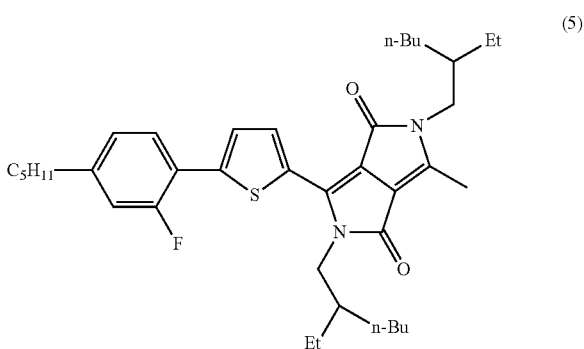

(5)

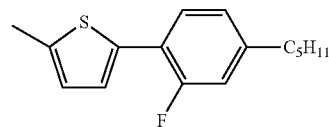

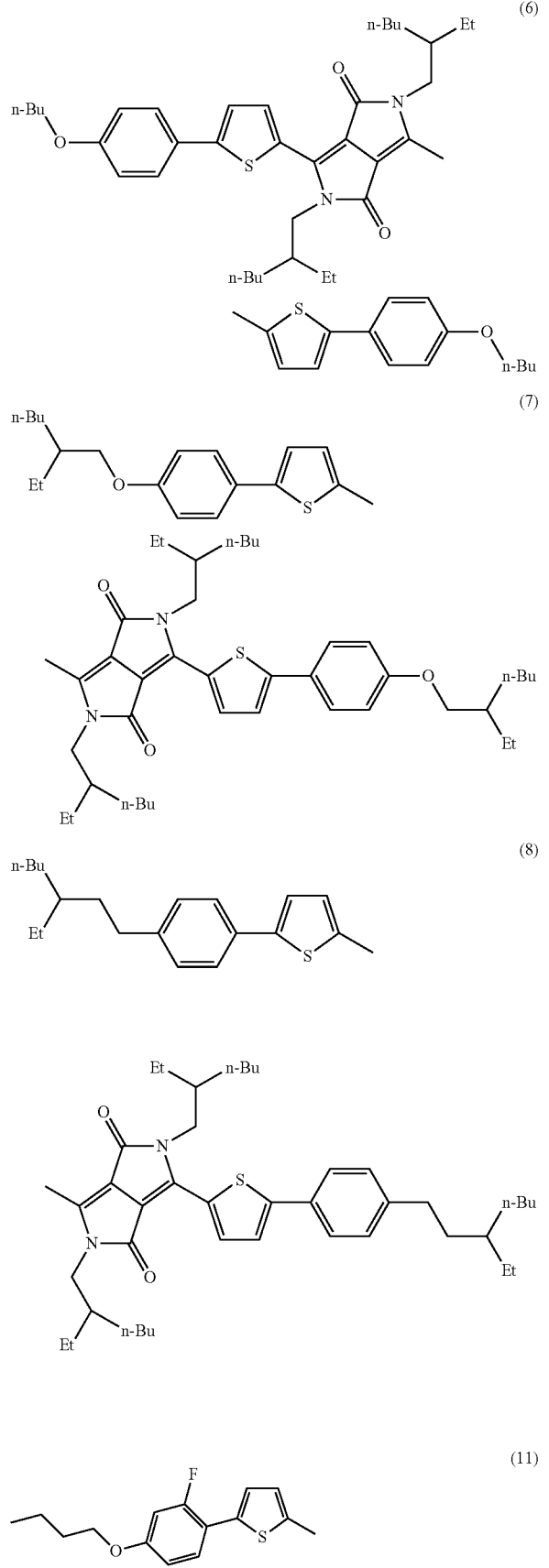

and additionally comprises 3 to 25 different liquid-crystalline compounds.

2. The mixture according to claim 1, wherein the degree of anisotropy R of said one or more compounds selected from compounds (5), (6), (7), (8), (11), and (13) is greater than 0.6.

3. The mixture according to claim 1, wherein said mixture comprises precisely one, two, three or four different compounds selected from compounds (5), (6), (7), (8), (11), and (13).

4. The mixture according to claim 1, wherein said mixture is a thermotropic liquid-crystalline material.

5. The mixture according to claim 1, wherein said 3 to 25 different liquid-crystalline compounds are selected from liquid-crystalline compounds containing two, three or four structural elements, wherein each of said structural elements contains a 1,4-phenylene and/or 1,4-cyclohexylene group.

6. The mixture according to claim 1, wherein said mixture additionally contains one or more dye compounds having a different structure than compounds (5), (6), (7), (8), (11), and (13).

7. The mixture according to claim 6, the one or more additional dye compounds having a different structure than compounds (5), (6), (7), (8), (11), and (13) are selected from perylenes, terrylenes, benzothiadiazoles and azo dyes.

8. A method for regulating the entry of light from one space into another space comprising passing said light through a device containing a switching layer wherein said switching layer contains a mixture according to claim 1.

9. A device for regulating the entry of light into a space, comprising a mixture according to claim 1.

10. The device according to claim 9, wherein said device comprises the following layer sequence, where further layers may additionally be present:

a first substrate layer,
a first electrically conductive transparent layer,
a first alignment layer,
a switching layer comprising said mixture,
a second alignment layer,
a second electrically conductive transparent layer, and
a second substrate layer.

11. A window containing a device according to claim 9.

12. A mixture comprising at least one compound of formula (I-1-5)

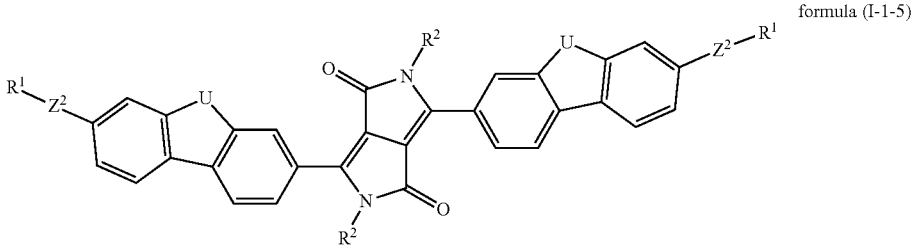

formula (I-1-5)

where
- $Z^2$ is on each occurrence, identically or differently, a single bond or a group selected from O, S, —C(R$^3$)$_2$—, —C(R$^3$)$_2$O—, —OC(R$^3$)$_2$—, —CR$^3$=CR$^3$— and —C≡C—, or two, three, four or five groups selected from the said groups combined with one another;
- R$^1$, R$^2$, R$^3$, and R$^4$ are on each occurrence, identically or differently, H, D, F, Cl, CN, N(R$^5$)$_2$, an alkyl, alkoxy or thioalkoxy group having 1 to 15 C atoms or an alkenyl or alkynyl group having 2 to 15 C atoms, where the above-mentioned groups may each be substituted by one or more radicals R$^5$ and where one or more CH$_2$ groups in the above-mentioned groups may each be replaced by —R$^5$C=CR$^5$—, —C≡C—, C=O, C=S, —C(=O)O—, —O(C=O)—, Si(R$^5$)$_2$, NR$^5$, —O— or —S—, or an aryl or heteroaryl group having 5 to 30 aromatic ring atoms, which may in each case be substituted by one or more radicals R$^5$;
- R$^5$ is on each occurrence, identically or differently, H, D, F, Cl, CN, N(R$^6$)$_2$, an alkyl, alkoxy or thioalkoxy group having 1 to 15 C atoms or an alkenyl or alkynyl group having 2 to 15 C atoms, where the above-mentioned groups may each be substituted by one or more radicals R$^6$ and where one or more CH$_2$ groups in the above-mentioned groups may each be replaced by -R$^6$C=CR$^6$—, —C≡C—, C=O, C=S, —C(=O)O—, —O(C=O)—, Si(R$^6$)$_2$, NR$^6$, —O— or —S—, or an aryl or heteroaryl group having 5 to 30 aromatic ring atoms, which may in each case be substituted by one or more radicals R$^6$;
- R$^6$ is on each occurrence, identically or differently, H, F or an aliphatic organic radical having 1 to 20 C atoms, in which one or more H atoms may each be replaced by F, or an aryl or heteroaryl group having 5 to 20 C atoms, in which one or more H atoms may each be replaced by F; and
- U is on each occurrence, identically or differently, C=O and C(R$^4$)$_2$.

13. The mixture according to claim 12, wherein
- U is equal to C(R$^4$)$_2$;
- $Z^2$ is on each occurrence, identically or differently, a single bond or a group selected from O, S, C(R$^3$)$_2$, —C(R$^3$)$_2$O—, —OC(R$^3$)$_2$—, —CR$^3$=CR$^3$— and —C≡C—;
- R$^1$ is on each occurrence, identically or differently, F or a straight-chain alkyl or alkoxy group having 3 to 12 C atoms, which may be substituted by one or more radicals R$^5$, or a branched alkyl or alkoxy group having 3 to 12 C atoms, which may be substituted by one or more radicals R$^5$, or a cyclic alkyl group having 6 C atoms, which may be substituted by one or more radicals R$^5$, where one or more CH$_2$ groups in the alkyl and alkoxy groups may be replaced by —O— or —S—;
- R$^2$ is on each occurrence, identically or differently, an alkyl group having 1 to 12 C atoms, which may be substituted by one or more radicals R$^5$, particularly preferably a branched alkyl group having 3 to 12 C atoms, which may be substituted by one or more radicals R$^5$.

14. The mixture according to claim 12, wherein said compounds of formula (I-1-5) are selected from the following compounds:

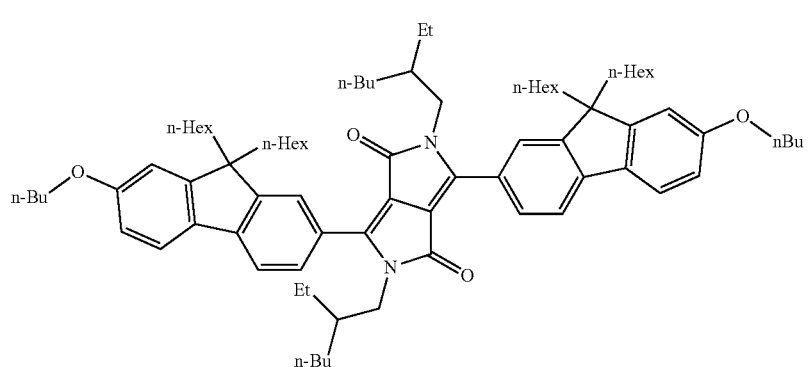

(1)

-continued

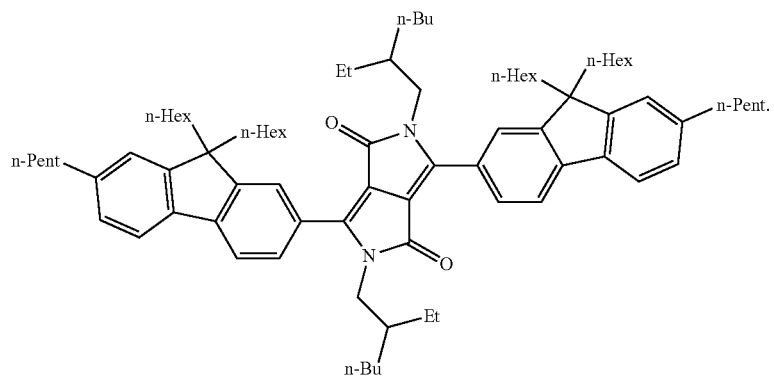

(2)

15. The mixture according to claim 1, wherein each individual compound selected from the compounds (5), (6), (7), (8), (11), and (13) is present in said mixture in a proportion of 0.01 to 10% by weight.

16. The mixture according to claim 1, wherein said mixture has an optical anisotropy ($\Delta n$) of 0.01 to 0.3.

17. The mixture according to claim 1, wherein said mixture comprises one or more chiral dopants in a total concentration of 0.01 to 3% by weight.

* * * * *